(12) United States Patent
Nishimura et al.

(10) Patent No.: US 10,988,150 B2
(45) Date of Patent: Apr. 27, 2021

(54) RAILCAR STATE MONITORING DEVICE AND TRAIN SET INCLUDING SAME

(71) Applicant: KAWASAKI JUKOGYO KABUSHIKI KAISHA, Kobe (JP)

(72) Inventors: Takehiro Nishimura, Kobe (JP); Yoshi Sato, Sanda (JP); Keiichiro Kamura, Kobe (JP); Masayuki Mitsue, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 404 days.

(21) Appl. No.: 16/063,338

(22) PCT Filed: Nov. 24, 2016

(86) PCT No.: PCT/JP2016/004950
§ 371 (c)(1),
(2) Date: Jun. 18, 2018

(87) PCT Pub. No.: WO2017/104110
PCT Pub. Date: Jun. 22, 2017

(65) Prior Publication Data
US 2019/0009804 A1 Jan. 10, 2019

(30) Foreign Application Priority Data

Dec. 17, 2015 (JP) .............................. JP2015-246100

(51) Int. Cl.
*B61K 9/04* (2006.01)
*B61L 15/00* (2006.01)
(Continued)

(52) U.S. Cl.
CPC ............. *B61L 15/0081* (2013.01); *B60L 3/00* (2013.01); *B60L 3/0084* (2013.01); *B61F 5/24* (2013.01);
(Continued)

(58) Field of Classification Search
CPC .. B61L 15/0027; B61L 15/0081; B61L 25/04; B61K 9/04; B60L 3/00; B60L 3/0038; Y02T 90/16
See application file for complete search history.

(56) References Cited

U.S. PATENT DOCUMENTS 4,501,006 A * 2/1985 Korenberg ............... B61K 9/06
116/216
5,777,547 A * 7/1998 Waldrop ............... B61L 25/028
340/438

(Continued)

FOREIGN PATENT DOCUMENTS

EP 3300987 A1 * 4/2018 ............... B61K 9/04
JP 2003156037 A * 5/2003
(Continued)

*Primary Examiner* — Zachary L Kuhfuss
(74) *Attorney, Agent, or Firm* — Oliff PLC

(57) ABSTRACT

A state monitoring device for use in a train set constituted by coupling cars each including a carbody and a pair of bogies arranged at both respective longitudinal direction end portions of the carbody and supporting the carbody includes: sensors provided at the respective bogies and configured to detect state information of devices provided at the bogies; wireless transmitters provided at the respective bogies and configured to wirelessly transmit sensor signals containing the detected state information; and at least one wireless receiver configured to receive the sensor signals wirelessly transmitted from the wireless transmitters.

15 Claims, 3 Drawing Sheets

(51) Int. Cl.
    *B60L 3/00*         (2019.01)
    *B61F 5/24*         (2006.01)
    *B61L 25/04*       (2006.01)

(52) U.S. Cl.
    CPC ............ *B61K 9/04* (2013.01); *B61L 15/0027* (2013.01); *B61L 25/04* (2013.01); *B60L 3/003* (2013.01); *B60L 3/0038* (2013.01); *Y02T 90/16* (2013.01)

(56) References Cited

U.S. PATENT DOCUMENTS

| | | | | |
|---|---|---|---|---|
| 6,511,023 | B2* | 1/2003 | Harland | B61L 25/021 |
| | | | | 246/122 R |
| 7,688,218 | B2* | 3/2010 | LeFebvre | B61L 25/021 |
| | | | | 340/682 |
| 8,950,711 | B2* | 2/2015 | Agostini | B61K 9/06 |
| | | | | 246/169 A |
| 2015/0057956 | A1* | 2/2015 | Ooe | G01N 29/44 |
| | | | | 702/56 |
| 2019/0009804 | A1* | 1/2019 | Nishimura | B60L 3/00 |
| 2019/0047598 | A1* | 2/2019 | Nishimura | G01K 1/14 |
| 2019/0063532 | A1* | 2/2019 | Sato | F16D 66/02 |
| 2019/0071105 | A1* | 3/2019 | Nishimura | F16C 41/00 |
| 2020/0062121 | A1* | 2/2020 | Sato | F16C 19/04 |

FOREIGN PATENT DOCUMENTS

| | | |
|---|---|---|
| JP | 2006-288198 A | 10/2006 |
| JP | 2009-072057 A | 4/2009 |
| JP | 2009-521902 A | 6/2009 |
| JP | 2014-430353 A | 12/2014 |
| WO | 2007/076107 A2 | 7/2007 |

\* cited by examiner

RAILCAR STATE MONITORING DEVICE AND TRAIN SET INCLUDING SAME

TECHNICAL FIELD

The present invention relates to a railcar state monitoring device for use in a train set constituted by coupling a plurality of cars to one another and a train set including the railcar state monitoring device.

BACKGROUND ART

A state monitoring device configured to monitor whether or not a railcar bogie has an abnormality has been known (see PTL 1, for example). According to this device, for example, a sensor signal including information about a temperature of a bearing of the bogie is transmitted from a bogie-side wireless transmitter to a carbody-side wireless receiver by near field communication, and the sensor signal received by the wireless receiver is temporarily stored in a data storage processing device mounted on a carbody.

CITATION LIST

Patent Literature

PTL 1: Published Japanese Translation of PCT Application No. 2009-521902

SUMMARY OF INVENTION

Technical Problem

A carbody of a railcar is supported by a pair of bogies arranged close to both respective carbody longitudinal direction end portions of the carbody, and a plurality of underfloor devices (for example, an inverter, a transformer, and the like) are provided between the pair of bogies. Therefore, when performing wireless communication, these underfloor devices become obstacles, and signals are not satisfactorily received in some cases. Therefore, in order that the wireless receiver receives the sensor signal in stable communication quality without being obstructed by the devices, it is necessary to provide wireless receivers for respective bogies at positions right above the bogies.

An object of the present invention is to, while maintaining stable communication quality, reduce the number of wireless receivers included in an entire train set, and with this, reduce cost and installation workload of a state monitoring device.

Solution to Problem

A railcar state monitoring device according to one aspect of the present invention is a railcar state monitoring device for use in a train set constituted by coupling cars each including a carbody and a pair of bogies, the bogies being arranged at both respective longitudinal direction end portions of the carbody and supporting the carbody, the train set including a first car and a second car adjacent to the first car, the first car including a first carbody and a pair of first bogies, the second car including a second carbody and a pair of second bogies, the state monitoring device including: sensors provided at the respective bogies and configured to detect state information of devices provided at the bogies; wireless transmitters provided at the respective bogies and configured to wirelessly transmit sensor signals containing the detected state information; and at least one wireless receiver configured to receive the sensor signals wirelessly transmitted from the wireless transmitters, the at least one wireless receiver including a first wireless receiver arranged between the first bogie located close to the second car out of the pair of first bogies and the second bogie located close to the first car out of the pair of second bogies, the first wireless receiver being configured to receive the state information of the first bogie located close to the second car and the state information of the second bogie located close to the first car.

According to the above configuration, the first wireless receiver is arranged between the first bogie located close to the second car out of the pair of first bogies and the second bogie located close to the first car out of the pair of second bogies. Therefore, the first wireless receiver can receive the sensor signals from the wireless transmitters provided at the bogies of the two different cars without being obstructed by the devices provided under a floor of the carbody. On this account, while maintaining the stable communication quality, the number of wireless receivers included in the entire train set can be reduced, and with this, the cost and installation workload of the state monitoring device can be reduced.

A train set including a state monitoring device according to one aspect of the present invention is a train set including a state monitoring device and constituted by coupling cars each including a carbody and a pair of bogies, the bogies being arranged at both respective longitudinal direction end portions of the carbody and supporting the carbody, the train set further including a first car and a second car adjacent to the first car, the first car including a first carbody and a pair of first bogies, the second car including a second carbody and a pair of second bogies, the state monitoring device including: sensors provided at the respective bogies and configured to detect state information of devices provided at the bogies; wireless transmitters provided at the respective bogies and configured to wirelessly transmit sensor signals containing the detected state information; and at least one wireless receiver configured to receive the sensor signals wirelessly transmitted from the wireless transmitters, the at least one wireless receiver being arranged between the first bogie located close to the second car out of the pair of first bogies and the second bogie located close to the first car out of the pair of second bogies, the at least one wireless receiver being configured to receive the state information of the first bogie located close to the second car and the state information of the second bogie located close to the first car, the car including the wireless receiver and the car not including the wireless receiver being alternately coupled with each other.

According to the above configuration, while maintaining the stable communication quality, the number of wireless receivers included in the entire train set can be reduced, and with this, the cost and installation workload of the state monitoring device can be reduced.

It should be noted that the "first car" and the "second car" just denote individual cars constituting a railcar and do not necessarily have to correspond to the first car and the second car in the embodiment (for example, the above "first car" does not have to be a head car (end car)). Advantageous Effects of Invention According to the present invention, while maintaining the stable communication quality, the number of wireless receivers included in the entire train set can be reduced, and with this, the cost and installation workload of the state monitoring device can be reduced.

DESCRIPTION OF EMBODIMENTS

Hereinafter, an embodiment will be explained with reference to the drawings.

Train Set

Figure 1:
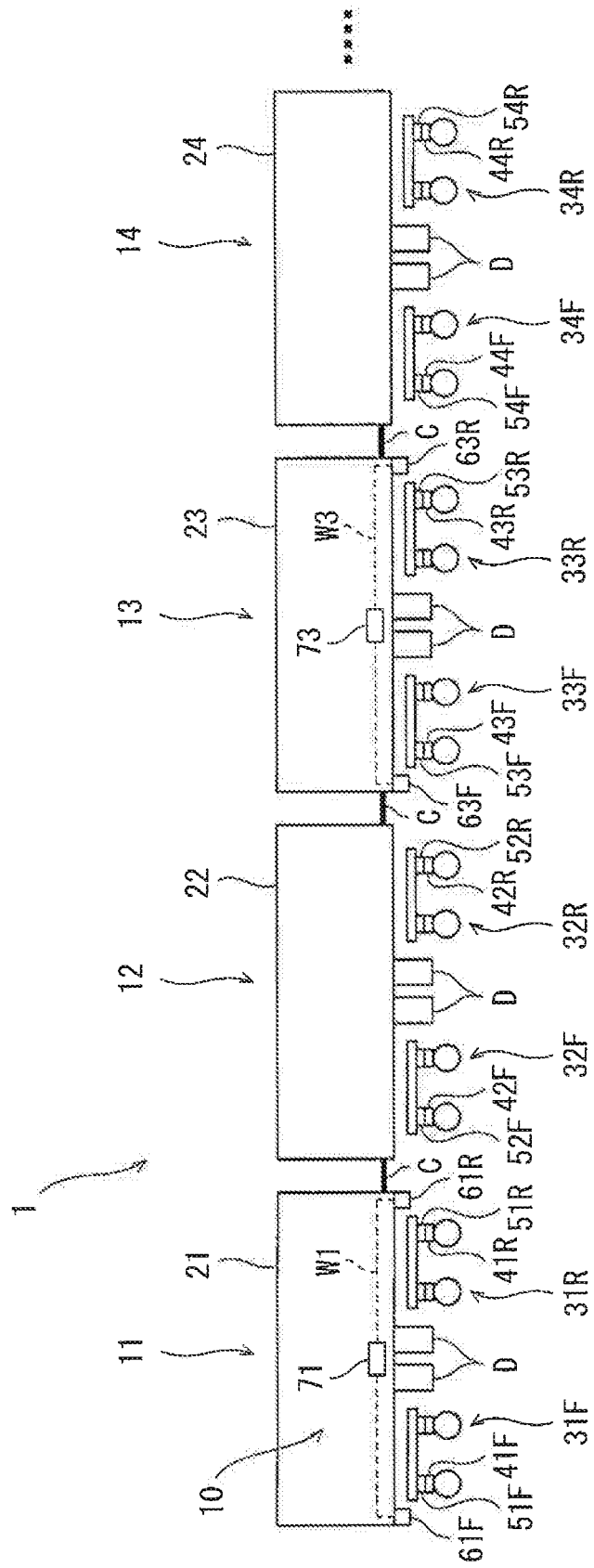
FIG. 1 is a schematic diagram showing a train set including a railcar state monitoring device according to an embodiment.

FIG. 1 is a schematic diagram showing a train set 1 including a railcar state monitoring device 10 according to the embodiment. As shown in FIG. 1, the train set 1 includes a first car 11, a second car 12 adjacent to the first car 11, a third car 13 adjacent to the second car 12, and a fourth car 14 adjacent to the third car 13. The train set 1 is constituted by coupling the cars 11 to 14 in series to one another by couplers C. It should be noted that FIG. 1 shows only four cars of the train set including five or more cars, and the number of cars included in the train set is not limited to this.

The first car 11 includes a first carbody 21 and a pair of first bogies 31F and 31R. The first bogies 31F and 31R are arranged close to both respective longitudinal direction end portions of the first carbody 21 and support the first carbody 21. The second car 12 includes a second carbody 22 and a pair of second bogies 32F and 32R. The second bogies 32F and 32R are arranged close to both respective longitudinal direction end portions of the second carbody 22 and support the second carbody 22. The third car 13 includes a third carbody 23 and a pair of third bogies 33F and 33R. The third bogies 33F and 33R are arranged close to both respective longitudinal direction end portions of the third carbody 23 and support the third carbody 23. The fourth car 14 includes a fourth carbody 24 and a pair of fourth bogies 34F and 34R. The fourth bogies 34F and 34R are arranged close to both respective longitudinal direction end portions of the fourth carbody 24 and support the fourth carbody 24. A plurality of underfloor devices D (for example, an inverter, a transformer, and the like) are provided under the first carbody 21 of the first car 11 and between the pair of first bogies 31F and 31R. It should be noted that in each of the second to fourth cars 12 to 14, the underfloor devices D are provided in the same manner as in the first car 11.

State Monitoring Device

Figure 2:
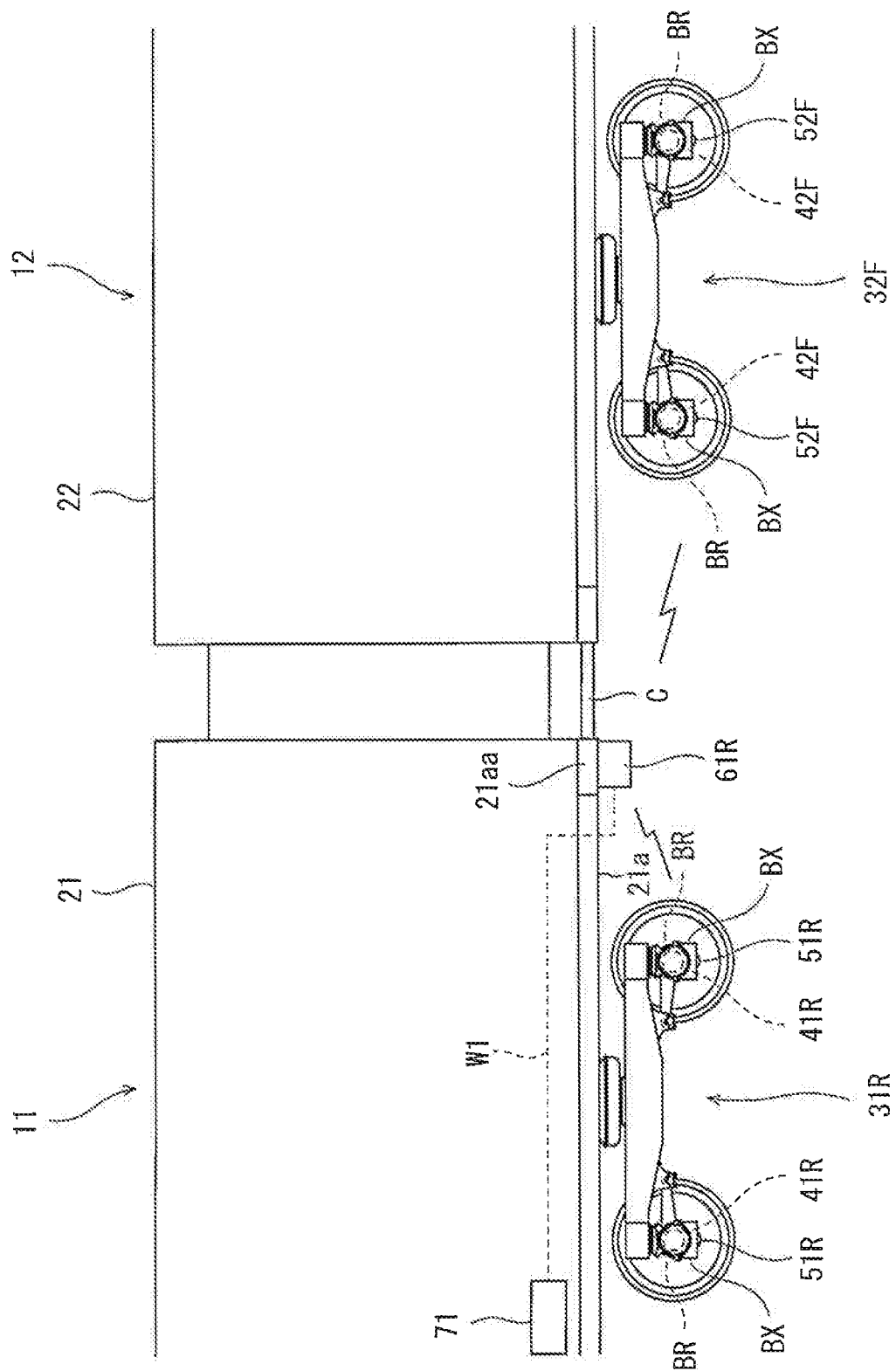
FIG. 2 is an enlarged view showing major components of the train set shown in FIG. 1.
Figure 3:
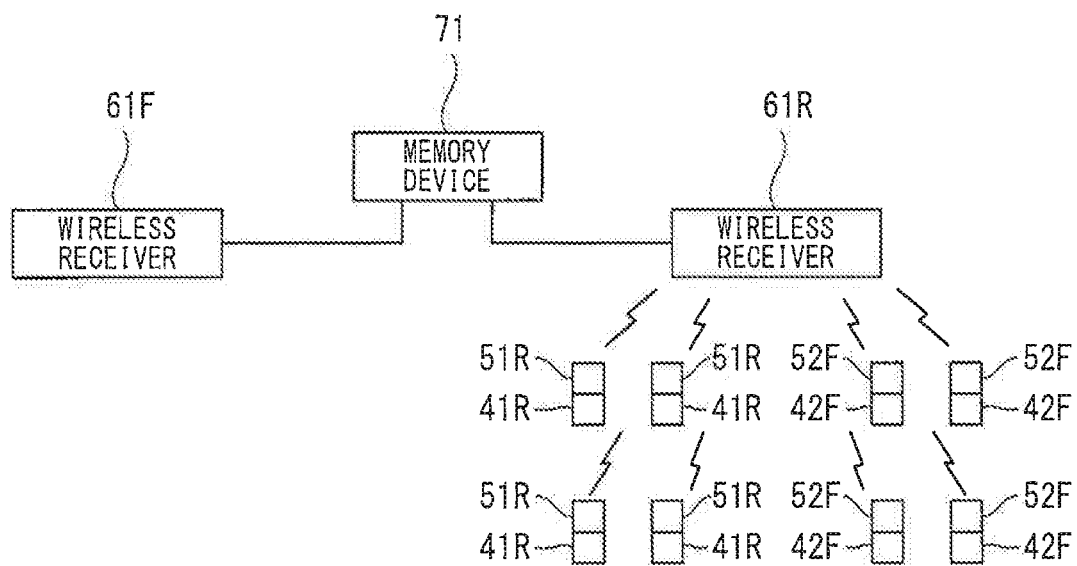
FIG. 3 is a block diagram showing the state monitoring device shown in FIG. 2.

FIG. 2 is an enlarged view showing major components of the train set 1 shown in FIG. 1. FIG. 3 is a block diagram showing the state monitoring device 10 shown in FIG. 2. As shown in FIGS. 1 to 3, the train set 1 includes the railcar state monitoring device 10. As one example, the state monitoring device 10 is a device configured to monitor temperatures of bearings BR in axle boxes BX of bogies 31F to 34F and 31R to 34R. The state monitoring device 10 includes first to fourth temperature sensors 41F to 44F and 41R to 44R, first to fourth wireless transmitters 51F to 54F and 51R to 54R, first and second wireless receivers 61F, 61R, 63F, and 63R, and first and second memory devices 71 and 73.

Temperature Sensors

The first to fourth temperature sensors 41F to 44F and 41R to 44R are provided at the respective axle boxes BX of the first to fourth bogies 31F to 34F and 31R to 34R and detect the temperatures (state information) of the bearings BR (devices) in the axle boxes BX. To be specific, four temperature sensors are provided for each bogie.

Wireless Transmitters

The first to fourth wireless transmitters 51F to 54F and 51R to 54R are arranged at the respective axle boxes BX so as to correspond to the first to fourth temperature sensors 41F to 44F and 41R to 44R and wirelessly transmit sensor signals containing information about the temperatures detected by the temperature sensors. In the present embodiment, the wireless transmitter and the temperature sensor are accommodated in one casing, and the casing is provided at the axle box. As with the temperature sensors, the number of wireless transmitters provided for each bogie is four.

Wireless Receivers

The first wireless receivers 61F and 61R are provided at the first carbody 21, and the second wireless receivers 63F and 63R are provided at the third carbody 23. The wireless receivers are provided at every other car, and the wireless receivers are not provided at any of the second car 12 and the fourth car 14. To be specific, the train set 1 is constituted by alternately coupling the car including the wireless receivers and the car not including the wireless receivers with each other.

The first wireless receiver 61R is arranged between the first bogie 31R, located close to the second car 12, of the first car 11 and the second bogie 32F, located close to the first car 11, of the second car 12. In the present embodiment, the first wireless receiver 61R is attached to a lower portion of an end portion, located close to the second car 12, of the first carbody 21. Specifically, as shown in FIG. 2, the first wireless receiver 61R is attached to an end portion, located close to the second car 12, of an underframe 21a of the first carbody 21. For example, the first wireless receiver 61R is attached to the vicinity of a car width direction middle portion of an end beam 21aa of the underframe 21a of the first carbody 21.

The second wireless receiver 63F is arranged between the second bogie 32R, located close to the third car 13, of the second car 12 and the third bogie 33F, located close to the second car 12, of the third car 13. In the present embodiment, the second wireless receiver 63F is attached to a lower portion of an end portion, located close to the second car 12, of the third carbody 23. To be specific, the second wireless receiver 63F is provided in the same manner as the first wireless receiver 61R.

Similarly, the second wireless receiver 63R is arranged between the third bogie 33R, located close to the fourth car 14, of the third car 13 and the fourth bogie 34F, located close to the third car 13, of the fourth car 14. The second wireless receiver 63R is provided in the same manner as the first wireless receiver 61R.

The first wireless receiver 61F provided as above receives the sensor signals wirelessly transmitted from the wireless transmitters 51F. The first wireless receiver 61R receives the sensor signals wirelessly transmitted from the first wireless transmitters 51R and the second wireless transmitters 52F. To be specific, the first wireless receiver 61R receives the sensor signals of the first bogie 31R of the own car and the sensor signals of the second bogie 32F of the adjacent car.

Similarly, the second wireless receiver 63F receives the sensor signals wirelessly transmitted from the second wireless transmitters 52R and the third wireless transmitters 53F. To be specific, the second wireless receiver 63F receives the sensor signals output from the four wireless transmitters 52R of the second bogie 32R located close to the third car 13 and the sensor signals output from the four wireless transmitters 53F of the third bogie 33F located close to the second car 12.

Similarly, the second wireless receiver 63R receives the sensor signals wirelessly transmitted from the third wireless transmitters 53R and the fourth wireless transmitters 54F. To be specific, the second wireless receiver 63R receives the sensor signals output from the four wireless transmitters 53R of the third bogie 33R located close to the fourth car 14 and the sensor signals output from the four wireless transmitters 54F of the fourth bogie 34F located close to the third car 11

Memory Devices

The first memory device 71 is provided at the first carbody 21, and the second memory device 73 is provided at the third carbody 23. The memory device is not provided at any of the second car 12 and the fourth car 14. To be specific, the memory device is provided at the car at which the wireless receivers connected to the memory device are provided. The first memory device 71 is connected to the first wireless receivers 61F and 61R through a communication line W1 and stores data of the sensor signals received by the first wireless receivers 61F and 61R. The second memory device 73 is connected to the second wireless receivers 63F and 63R through a communication line W3 and stores data of the sensor signals received by the second wireless receivers 63F and 63R. The data stored in the first and second memory devices 71 and 73 are accessible from an outside. For example, each of the first and second memory devices 71 and 73 is configured such that the data is extractable through a communication line, a recording medium, or the like, not shown.

Sensor Signals

Figure 4:
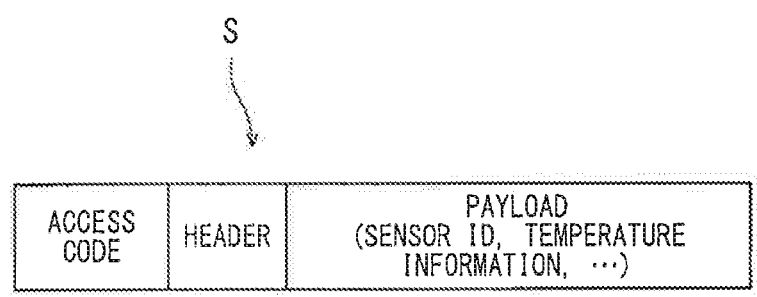
FIG. 4 is a diagram showing a format of a sensor signal wirelessly transmitted by a wireless transmitter of the state monitoring device shown in FIG. 3.

FIG. 4 is a diagram showing a format of a sensor signal S wirelessly transmitted from the wireless transmitters 51F to 54F and 51R to 54R of the state monitoring device 10 shown in FIG. 3. As one example, the wireless transmitters 51F to 54F and 51R to 54R and the wireless receivers 61F, 61R, 63F, and 63R perform wireless communication by utilizing near field communication (for example, Bluetooth (trademark)) that is low in power consumption. As shown in FIG. 4, the sensor signal S wirelessly transmitted by the wireless transmitters 51F to 54F and 51R to 54R includes an access code, a header, and a payload. The wireless transmitters 51F to 54F and 51R to 54R are associated one-to-one with the first to fourth temperature sensors 41F to 44F and 41R to 44R to which the wireless transmitters 51F to 54F and 51R to 54R are respectively attached. Specifically, the wireless transmitter (51F to 54F and 51R to 54R) describes information about the temperature, detected by the temperature sensor (first to fourth temperature sensors 41F to 44F and 41R to 44R) to which the wireless transmitter is connected, in the payload of the sensor signal S together with a sensor ID of the temperature sensor that has detected the temperature. The first and second memory devices 71 and 73 store the data of the sensor signals S received through the first and second wireless receivers 61F, 61R, 63F, and 63R. At this time, each of the first and second memory devices 71 and 73 stores the sensor signal S so as to associate the sensor ID with identification information (for example, a specific number) of the bearing BR (detection target device) that is a temperature detection target of the temperature sensor corresponding to the sensor ID among the first to fourth temperature sensors 41F to 44F and 41R to 44R.

According to the above explained configuration, since the first wireless receiver 61R is arranged between the first bogie 31R located close to the second car 12 and the second bogie 32F located close to the first car 11, the first wireless receiver 61R can receive, without being obstructed by the underfloor devices D, the sensor signals output from the first wireless transmitters 51R provided at the first bogie 11R of the first car 11 and the sensor signals output from the second wireless transmitters 52F provided at the second bogie 12F of the second car 12. The same is true for the second wireless receivers 63F and 63R. Therefore, while maintaining the stable communication quality, the number of wireless receivers included in the entire train set 1 can be reduced, and with this, the cost and installation workload of the state monitoring device 10 can be reduced.

The first wireless receiver 61F is attached to the vicinity of a car width direction middle portion of a front underframe end portion located close to the first bogie 31F of the first carbody 21, and obstacles (underfloor devices D) that attenuate wireless signals do not exist between the first wireless receiver 61F and the wireless transmitters 51F. Therefore, the first wireless receiver 61F can sensitively receive the sensor signals. Further, since the first wireless receiver 61R is attached to the lower portion of the end portion, located close to the second car 12, of the first carbody 21, the first wireless receiver 61R can sensitively receive the sensor signals output from the wireless transmitters 51R and 52F provided at the bogies 31R and 32F of the two different cars 11 and 13. The same is true for the second wireless receivers 63F and 63R.

Since the sensor signals output from the second wireless transmitters 52F and 52R provided at the second bogies 32F and 32R of the second car 12 are stored in the first memory device 71 provided at the first car 11 or the second memory device 73 provided at the third car 13, it is unnecessary to provide the memory device at the second car 12. The same is true for the fourth car 14. Therefore, the number of memory devices included in the entire train set 1 can be reduced, and with this, the cost and installation work of the state monitoring device 10 can be effectively reduced.

Since the first wireless receivers 61F and 61R and the first memory device 71 are provided at the first car 11, and the second wireless receivers 63F and 63R and the second memory device 73 are provided at the third car 13, the communication line W1 connecting the first wireless receivers 61F and 61R and the first memory device 71 does not have to extend between the adjacent cars, and the communication line W3 connecting the second wireless receivers 63F and 63R and the second memory device 73 does not have to extend between the adjacent cars. On this account, it becomes easy to constitute a new train set by reassembling the cars 11 to 14, and with this, the cost and installation workload of the state monitoring device 10 can be effectively reduced.

Each of the first and second memory devices 71 and 73 stores the sensor signal so as to associate the sensor ID of the temperature sensor (41F to 44F and 41R to 44R) with the identification information of the bearing BR that is the temperature detection target of the sensor. Thus, the sensor ID is associated with the detection target device, and even when the train set is reassembled, the temperatures of the bearings can be easily recognized without performing complex setting changes, and this can reduce management cost.

The present invention is not limited to the above embodiment, and modifications, additions, and eliminations may be made with respect to the configuration of the present invention. In the above embodiment, the temperature sensor configured to detect the temperature of the bearing is explained as the sensor configured to detect the state information of the device provided at the bogie. However, the above embodiment is not limited to this as long as the sensor detects the state of the bogie. For example, the sensor may be a temperature sensor configured to detect the temperature of a motor of the bogie. Or, the sensor may be a sensor configured to measure a wheel load of each wheel of the bogie. Or, the sensor may be a sensor configured to detect the state of a plate spring in a bogie including the plate spring as a suspension. Further, Bluetooth (trademark) is used as a wireless communication method. However, the present embodiment is not limited to this, and for example, Wi-Fi (trademark) or the like may be used. Further, the temperature sensor and the wireless transmitter may be configured as a single unit or separate units. The first wireless receiver 61R may be provided at an end portion, located close to the first car 11, of the second carbody 22.

REFERENCE SIGNS LIST 1 train set
10 state monitoring device
11 to 14 first to fourth cars
21 to 24 first to fourth carbodies
31F, 31R first bogie
32F, 32R second bogie
33F, 33R third bogie
34F, 34R fourth bogie
41F, 41R first temperature sensor
42F, 42R second temperature sensor
43F, 43R third temperature sensor
44F, 44R fourth temperature sensor
51F, 51R first wireless transmitter
52F, 52R second wireless transmitter
53F, 53R third wireless transmitter
54F, 54R fourth wireless transmitter
61F, 61R first wireless receiver
63F, 63R second wireless receiver
71 first memory device
73 second memory device

The invention claimed is:

1. A railcar state monitoring device for use in a train set constituted by adjacent first and second cars each including a carbody, a pair of bogies arranged at both respective longitudinal direction end portions of the carbody and supporting the carbody, and underfloor devices provided between the pair of bogies, the state monitoring device comprising:
sensors provided at a plurality of the bogies and configured to detect state information of devices provided at those bogies;
wireless transmitters provided at the bogies with sensors and configured to wirelessly transmit sensor signals containing the detected state information; and
at least one wireless receiver configured to receive the sensor signals wirelessly transmitted from the wireless transmitters, the at least one wireless receiver including a first wireless receiver arranged between a first bogie of the first car located nearest to the second car and second bogie of the second car located nearest to the first car, the first wireless receiver being configured to receive the state information of the first bogie and the state information of the second bogie.

2. The railcar state monitoring device according to claim 1, wherein the wireless receiver is attached to lower portions of both longitudinal direction end portions of the carbody of one of the first car and the second car.

3. The railcar state monitoring device according to claim 2, wherein the carbody of the one car further includes a memory device configured to store the sensor signals received by the wireless receiver.

4. The railcar state monitoring device according to claim 1, wherein:

the train set further includes a third car adjacent to the second car the third car including a carbody and a pair of bogies,
the state monitoring device further includes at least one memory device configured to store the sensor signals received by the wireless receiver,
the at least one wireless receiver further includes a second wireless receiver arranged between a third bogie of the second car located nearest to the third car and a fourth bogie of the third car located nearest to the second car,
the second wireless receiver is configured to receive the state information of the third bogie and the state information of the fourth bogie,
the at least one memory device includes a first memory device and a second memory device,
the first memory device is provided at the first car and stores the sensor signals received by the first wireless receiver, and
the second memory device is provided at the third car and stores the sensor signals received by the second wireless receiver.

5. The railcar state monitoring device according to claim 4, wherein:
the first wireless receiver is provided at the first car; and
the second wireless receiver is provided at the third car.

6. The railcar state monitoring device according to claim 3, wherein the memory device stores the sensor signal so as to associate an ID of the sensor with a detection target device of the sensor.

7. The railcar state monitoring device according to claim 1, wherein each of the bogies is provided with four sensors.

8. The railcar state monitoring device according to claim 7, further comprising:
a plurality of casings, each containing one of the sensors and one of the wireless transmitters,
wherein each casing is provided at an axle box of one of the bogies.

9. The railcar state monitoring device according to claim 1, wherein the first wireless receiver is attached to a lower portion of a longitudinal direction end portion nearest to the second car, of the carbody of the first car.

10. The railcar state monitoring device according to claim 9, wherein the first wireless receiver is attached to an underframe of the carbody of the first car.

11. The railcar state monitoring device according to claim 10, wherein the first wireless receiver is attached to a car width direction middle portion of an end beam of the underframe.

12. A train set comprising:
adjacent first and second cars each including:
a carbody;
a pair of bogies arranged at both respective longitudinal direction end portions of the carbody and supporting the carbody; and
underfloor devices provided between the pair of bogies; and
a state monitoring device including:
sensors provided at a plurality of the bogies and configured to detect state information of devices provided at those bogies;
wireless transmitters provided at the bogies with sensors and configured to wirelessly transmit sensor signals containing the detected state information; and
at least one wireless receiver configured to receive the sensor signals wirelessly transmitted from the wireless transmitters, the at least one wireless receiver being arranged between a first bogie of the first car located nearest to the second car and a second bogie of the second car located nearest to the first car, the at least one wireless receiver being configured to receive the state information of the first bogie and the state information of the second bogie, wherein the first car has one of the at least one wireless receiver, and the second car does not have one of the at least one wireless receiver.

13. The train set according to claim 12, wherein the first wireless receiver is attached to a lower portion of a longitudinal direction end portion, nearest to the second car, of the carbody of the first car.

14. The train set according to claim 13, wherein the first wireless receiver is attached to an underframe of the carbody of the first car.

15. The train set according to claim 14, wherein the first wireless receiver is attached to a car width direction middle portion of an end beam of the underframe.

\* \* \* \* \*